United States Patent
Yie et al.

(10) Patent No.: US 9,369,508 B2
(45) Date of Patent: Jun. 14, 2016

(54) METHOD FOR TRANSMITTING A SCALABLE HTTP STREAM FOR NATURAL REPRODUCTION UPON THE OCCURRENCE OF EXPRESSION-SWITCHING DURING HTTP STREAMING

(75) Inventors: Chungku Yie, Incheon (KR); Ul Ho Lee, Hwaseong-si (KR)

(73) Assignee: HUMAX CO., LTD., Yongin (KR)

( * ) Notice: Subject to any disclaimer, the term of this patent is extended or adjusted under 35 U.S.C. 154(b) by 201 days.

(21) Appl. No.: 13/877,995

(22) PCT Filed: Oct. 5, 2011

(86) PCT No.: PCT/KR2011/007340
§ 371 (c)(1),
(2), (4) Date: Apr. 5, 2013

(87) PCT Pub. No.: WO2012/047004
PCT Pub. Date: Apr. 12, 2012

(65) Prior Publication Data
US 2013/0204973 A1   Aug. 8, 2013

(30) Foreign Application Priority Data
Oct. 6, 2010   (KR) .................. 10-2010-0097247

(51) Int. Cl.
| | |
|---|---|
| *G06F 15/173* | (2006.01) |
| *H04L 29/06* | (2006.01) |
| *H04N 21/2662* | (2011.01) |
| *H04N 21/61* | (2011.01) |
| *H04N 21/6437* | (2011.01) |
| *H04N 21/2343* | (2011.01) |
| *H04N 21/845* | (2011.01) |

(52) U.S. Cl.
CPC .......... *H04L 65/602* (2013.01); *H04L 65/4084* (2013.01); *H04L 65/607* (2013.01); *H04L 65/80* (2013.01); *H04N 21/234327* (2013.01); *H04N 21/2662* (2013.01); *H04N 21/6125* (2013.01); *H04N 21/6437* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 6,496,980 | B1 | 12/2002 | Tillman et al. |
| 7,095,782 | B1 | 8/2006 | Cohen et al. |

(Continued)

FOREIGN PATENT DOCUMENTS

| | | |
|---|---|---|
| CN | 1358388 A | 7/2002 |
| CN | 1381139 A | 11/2002 |

(Continued)

*Primary Examiner* — Shirley Zhang

(57) ABSTRACT

Discussed is a processing method which enables natural reproduction upon the occurrence of representation switching during the transmission of an HTTP stream. The method includes: constructing, for a first representation, a plurality of segments including base layer of scalable video coding, constructing, for a second representation with a higher resolution than the first representation, a plurality of segments including enhanced layer of scalable video coding, and transmitting at least one of at least a part of the plurality of segments for the first representation and at least a part of the plurality of segments for the second representation, when transmitting the second representation. Only base layers may be extracted from the second representation and used as a reference in decoding low bit-rate segments to be reproduced in the future, thus multimedia content can be seamlessly displayed upon the occurrence of representation-switching.

13 Claims, 6 Drawing Sheets

(56) References Cited

U.S. PATENT DOCUMENTS

| | | | |
|---|---|---|---|
| 7,289,506 B1 * | 10/2007 | Hannuksela | 370/394 |
| 7,593,335 B2 * | 9/2009 | Mascolo | 370/235 |
| 8,488,066 B2 * | 7/2013 | Gao | 348/731 |
| 8,607,283 B2 * | 12/2013 | Civanlar et al. | 725/91 |
| 8,798,264 B2 * | 8/2014 | Catrein et al. | 380/42 |
| 2003/0099364 A1 | 5/2003 | Thompson et al. | |
| 2003/0169813 A1 * | 9/2003 | Van Der Schaar | 375/240.12 |
| 2005/0254575 A1 * | 11/2005 | Hannuksela | H04N 19/70 375/240.1 |
| 2007/0003251 A1 | 1/2007 | Chung et al. | |
| 2007/0121719 A1 | 5/2007 | Van Der Schaar et al. | |
| 2008/0256254 A1 | 10/2008 | Kim et al. | |
| 2009/0122878 A1 * | 5/2009 | Liu | H04L 29/06027 375/240.26 |
| 2010/0011117 A1 | 1/2010 | Hristodorescu et al. | |
| 2011/0109810 A1 * | 5/2011 | Li et al. | 348/731 |

FOREIGN PATENT DOCUMENTS

| | | | |
|---|---|---|---|
| CN | 1860791 A | 11/2006 | |
| EP | 1742476 A1 | 10/2007 | |
| KR | 10-2004-0071151 A | 8/2004 | |
| KR | 10-2004-0096718 A | 11/2004 | |
| KR | 10-2007-0020727 A | 2/2007 | |
| KR | 10-2008-0093330 A | 10/2008 | |
| WO | WO 00/65834 A1 | 11/2000 | |
| WO | WO 2008013883 A2 * | 1/2008 | H04N 7/58 |
| WO | WO 2010/014211 A1 | 2/2010 | |

\* cited by examiner

METHOD FOR TRANSMITTING A SCALABLE HTTP STREAM FOR NATURAL REPRODUCTION UPON THE OCCURRENCE OF EXPRESSION-SWITCHING DURING HTTP STREAMING

CROSS REFERENCE TO RELATED APPLICATIONS

This application is the National Phase of PCT/KR2011/007340 filed on Oct. 5, 2011, which claims priority under 35 U.S.C. §119(a) to Patent Application No. 10-2010-0097247 filed in the Republic of Korea on Oct. 6, 2010, all of which are hereby expressly incorporated by reference into the present application.

TECHNICAL FIELD

The present invention relates to a HTTP streaming technology that is one of multimedia transmitting methods, and more particularly, to a processing method that enables natural reproduction upon the occurrence of representation-switching during the transmission of an HTTP stream.

BACKGROUND ART

As the recent development of mobile communication technology promotes the rapid popularization of mobile communication terminals, our lives have been changed for most of ordinary person to always carry mobile communication terminals such as mobile phones, personal digital assistants (PDAs), and smart phones. Mobile communication terminals allows users to easily access communication networks and system resources that related art communication systems have to be efficiently distributed.

Among such technologies, streaming services receiving multimedia contents such as audio contents and video contents in real time via wireless contents communication networks and playing them are provided while users are on the go with mobile communication terminals. Streaming services applied to wired IPTVs provide multimedia contents through a Real-time Transport Protocol (RTP) or a combination of the RTP and MPEG-2.

However, in the case of wireless streaming services, problems arise when they are provided through the RTP or a combination of the RTP and the MPEG-2. Firstly, since the RTP does not support multiplexing, when multimedia contents are divided into a plurality of packets and transmitted, a plurality of ports may need to be opened according to the plurality of packets and also streaming services may not be provided normally by using the RTP, especially in a firewall installed area.

Secondly, the RTP operates on a UDP. The UDP divides multimedia contents into a plurality of packets and transmits them to a receiving side on a wireless internet, and then, does not confirm whether the receiving side receives the transmitted packets in a correct order. For this reason, packet loss may occur, and additionally, when packet loss occurs, since it means that lost contents packets are not retransmitted to the receiving side, this may cause contents loss. Accordingly, streaming services are provided to mobile communication terminals such as smart phones through a Hyper Text Protocol (HTTP) operating on a TCP. This is commonly referred to as 'HTTP streaming'.

In general, since the HTTP is a protocol used to transmit hyper text such as texts and images, when a mobile communication terminal such as a smart phone provides multimedia contents streaming service through the HTTP, due to the large size of multimedia contents, the streaming service cannot be provided in real time. Then, hereinafter, an internal structure of a system for HTTP streaming service will be described in more detail with reference to FIG. 1.

FIG. 1 is a block diagram illustrating an internal structure of a system for HTTP streaming service in a multimedia system.

Referring to FIG. 1, the system for HTTP streaming service may be configured, including a server 101 and a client, and may be configured, further including a storage unit 103 and a buffer 104. The server 101 may divide multimedia contents, that is, a streaming target, into a plurality of segments in the same or different sizes. Firstly, the case that the server 101 divides multimedia contents, that is, a streaming target, into a plurality of segments in the same sizes will be described. The server 101 divides multimedia contents, that is, a streaming target, by 2 sec units, so that the server 101 may generate and store a plurality of segments. At this point, the same multimedia contents may have different versions according to types of a bit rate, a resolution, and an encoding codec, and this may be expressed as representation (hereinafter, this will be referred to as "representation").

For example, when a playback time of multimedia contents is 90 min and a bit rate corresponding to contents information has 75 kbps, 150 kbps, and 300 kbps versions, the server 101 divides the multimedia contents having the playback time of 90 min by 2 sec unit according to each version, so that the multimedia contents are divided into 2700 segments. Also, since the 2700 segments may have different versions according to types of a bit rate, a resolution, and an encoding codec, the server 101 divides the multimedia contents into a total of 8100 segments.

Secondly, the case that the server 101 divides multimedia contents, that is, a streaming target, into a plurality of segments in different sizes will be described. For example, when a playback time of multimedia contents is 90 min and a bit rate corresponding to contents information has 75 kbps, 150 kbps, and 300 kbps versions, the server 101 divides the multimedia contents into a plurality of segments by 2 sec unit during a playback time from 0 min to 3 min, and divides the multimedia contents into a plurality of segments by 4 sec unit during a playback time from 3 min to 4 min.

The segments produced by the server 101 include a group of pictures GOP (hereinafter is referred to as 'GOP') which consists of a header section, an I (intra-coded) frame on the basis of intra-frame encoding, P frame and B frame on the basis of predictive encoding.

The server 101 dividing multimedia contents into a plurality of segments allocates URL information to the plurality of segments divided in a predetermined number, and stores the URL information on each segment in a media information file and transmits it to the client 102. At this point, the media information file may be differently referred to as Media Presentation Description (MPD) or a manifest file according to organizations for standardization, which standardize HTTP streaming.

The server 101 may detect that the client 102 initiate a streaming service. When the server 101 detect that the client 102 initiate the streaming service, the server 101 transmits media information file, which stores URL information related to segments, to the client 102 via buffer 104. The server 101 receives a segment request message from the client 102, receives the segments, which correspond to segment URL information included in segment transmission request message, from storage unit 103, and transmits the received segments to the client 102.

The client 102 may initiate a streaming service. When the client 102 initiates the streaming service, the client 102 receives, from the server 101, media information file, which stores URL information related to segments. In addition, the client 102 may detect the network transmission environment, and may transmit segment request message, which requests segment to be outputted depending upon the detected current network transmission environment, to the server 101. In this case, the client 102 makes the URL information of the segment to be outputted to be included in the segment request message, and transmits the segment request message to the server 101.

The client 102 may receive segments from the server 101 to output the segments. For example, a representation switching may occur because the client 102 decodes P frame of the segment corresponding to low bit rate on reference to I frame with high bit rate, in case the client 102 senses or detects that the network transmission environment is deteriorated, the client 102 requests the transmission of the segments corresponding to low bit rate to the server 101, and the client 102 receives the segment corresponding to low bit rate to decode the segment corresponding to low bit rate.

The storage unit 103 receives segments divided by the server 101, and stores the received segments according to contents information and time. Additionally, when the server 101 receives a segment request message from the client 102, a segment(s), which corresponds to the received URL from the server 101, in the storage unit 103 may be searched for, and then, may be transmitted to the server 101. Then, when the server 101 divides multimedia contents by the same/different predetermined periods in order for HTTP streaming service and stores them in the storage unit 103, the internal structure of the storage unit 103 will be described in more detail with reference to FIGS. 2 and 3.

FIG. 2 is a block diagram when multimedia contents are divided into a plurality of segments with the same size in order for HTTP streaming service. FIG. 3 is a block diagram when multimedia contents are divided into a plurality of segments with a different size in order for HTTP streaming service.

The server 101 may divide multimedia contents, that is, a streaming target, into a plurality of segments in the same or different sizes. Firstly, the case that the server 101 divides multimedia contents, that is, a streaming target, into a plurality of segments in the same sizes will be described with reference to FIG. 2. For example, when a playback time of multimedia contents is 90 min, a bit rate corresponding to contents information has 500 kbps, 1 Mbps, and 2 Mbps versions, and a resolution has SD, 720P, and HD versions, the server 101 divides multimedia contents having a playback time of 90 min into 2700 segments by 2 sec unit according to each contents information. At this point, the divided 2700 segments are generated as segments having different representations according to 500 kbps, 1 Mbps, and 2 Mbps bit rates and SD, 720P, and HD resolutions, so that a total of 8100 segments are generated. The segments produced by the server 101 include a GOP which consists of a header section, an I frame on the basis of intra-frame encoding, P frame and B frame on the basis of predictive encoding.

That is, segments including contents during the period between 0 sec to 2 sec include a segment 203 corresponding to a bit rate of 500 kbps and a resolution of a SD version, a segment 204 corresponding to a bit rate of 1 Mbps and a resolution of a 720P version, and a segment 205 corresponding to a bit rate of 2 Mbps and a resolution of an HD version. The remaining segments are divided by 2 sec unit, so that they are divided into 2700 segments.

Secondly, the case that the server 101 divides multimedia contents, that is, a streaming target, into a plurality of segments in different sizes will be described with reference to FIG. 3. For example, when a playback time of multimedia contents is 90 min, a bit rate corresponding to contents information has 500 kbps, 1 Mbps, and 2 Mbps versions, and a resolution has SD, 720P, and HD versions, the server 101 divides the multimedia contents by 3 sec unit during the period between 0 sec to 3 sec according to each contents information, and divides the multimedia contents by 2 sec unit during the period between 3 sec to 4 sec, so that the multimedia contents are divided into a plurality of segments. The segments produced by the server 101 include a GOP which consists of a header section, an I frame on the basis of intra-frame encoding, P frame and B frame on the basis of predictive encoding.

That is, the server 101 generates segments in proportion to the number of versions according to the contents information. For this reason, when URL information corresponding to a large amount of segments is included in a media information file, the size of the media information file becomes larger, so that it becomes impossible to provide the media information file to the client 102 at a fast speed.

That is, segments including contents during the period between 0 sec to 3 sec include a segment 303 corresponding to a bit rate of 500 kbps and a resolution of a SD version, a segment 304 corresponding to a bit rate of 1 Mbps and a resolution of a 720P version, and a segment 305 corresponding to a bit rate of 2 Mbps and a resolution of an HD version. Segments including contents during the period between 3 sec to 5 sec include a segment corresponding to a bit rate of 500 kbps and a resolution of a SD version, a segment 306 corresponding to a bit rate of 1 Mbps and a resolution of a 720P version, and a segment corresponding to a bit rate of 2 Mbps and a resolution of an HD version. That is, the server 101 generates segments in proportion to the number of versions according to the contents information. Accordingly, when URL information corresponding to a large amount of segments is included in a media information file, the size of the media information file becomes larger, so that it becomes impossible to provide the media information file to the client 102 at a fast speed.

The client 102 may initiate streaming service. The client 102 may receive a segment corresponding to a predetermined representation from the server 101, and then, may output the segment. Additionally, the client 102 detects a current channel state and requests a segment according to the current channel state to the server 101. For example, when the client 102 detects that a current channel state becomes worse while receiving a segment corresponding to a bit rate of 300 kbps and outputs it on a screen, the client 102 requests the transmission of a segment corresponding to a low bit rate to the server 101, and then, receives a segment corresponding to a bit rate of 150 kbps from the server 101 so as to output the received segment.

For example, a representation switching may occur and thus screen interruption may occur because the client 102 decodes P frame of the segment corresponding to low bit rate on reference to I frame with high bit rate, in case the client 102 detects that the network transmission environment become worse, the client 102 requests the transmission of the segments corresponding to low bit rate to the server 101, and the client 102 receives the segment corresponding to low bit rate to decode the segment corresponding to low bit rate.

Additionally, since each segment has a different length of a playback time, a playback time of a currently-outputting segment may not continue with a playback time of a segment that is received from the server 101 to be outputted. For example, although a playback time of a current output segment corresponds to the period between 9 min 30 sec to 12 min 00 sec, when a playback time of a segment received from the server 101 and outputted is the period between 12 min 03 sec to 15 min 00 sec, in case a currently outputting segment switches into the next output segment, that is, in case representation switching occurs, screen interruption may occur.

Moreover, according as a playback time of multimedia contents, that is, a streaming target, becomes longer, i.e., according as the capacity of multimedia contents is increased, the number of divided segments is increased. Thus, a high capacity storage unit for storing a large amount of segments is required. According as a high capacity storage unit is used, high production costs for configuring a system are required.

DISCLOSURE OF THE INVENTION

Technical Problem

An object of the present invention to solve the problems is to provide a method and device for transmitting HTTP streams, thereby enabling natural reproduction upon the occurrence of representation-switching.

Another object of the present invention is to provide a method of receiving HTTP streams, thereby enabling natural reproduction upon the occurrence of representation-switching.

Technical Solution

A method of transmitting HTTP streams according to an embodiment of the present invention for achieving the former object of the present invention may include constructing, for a first representation, a plurality of segments that consist of base layers of scalable video coding, constructing, for a second representation with higher resolution than the first representation, a plurality of segments that consist of enhanced layers of scalable video coding, and transmitting at least a part of the plurality of segments for the first representation when transmitting the first representation, and transmitting at least one of at least a part of the plurality of segments for the first representation and at least a part of the plurality of segments for the second representation when transmitting the second representation.

A method of receiving an HTTP stream according to an embodiment of the present invention for achieving the latter object of the present invention includes receiving, from an HTTP streaming server, a part of a plurality of segments constructing a first representation and reproducing the received segment when reproducing the first representation, and receiving, from the HTTP streaming server, a part of the plurality of segments constructing the first representation and a part of a plurality of segments constructing a second representation, and reproducing the received segments when reproducing the second representation.

Advantageous Effects

When a processing method is used which enables natural reproduction upon the occurrence of representation-switching during the transmission of an HTTP stream, it is possible to receive a part of a first representation consisting of low bit-rate segments at base layer of scalable video coding and a part of a second representation consisting of high bit-rate segments at enhanced layer of scalable video coding. In addition, when an representation switching in which a switch from a high bit-rate to a low bit-rate occurs, it is possible to seamlessly provide multimedia contents because the first representation received simultaneously when the second representation is received can be used when the low bit-rate segment to be reproduced later is decoded.

MODE FOR CARRYING OUT THE INVENTION

Figure 1:
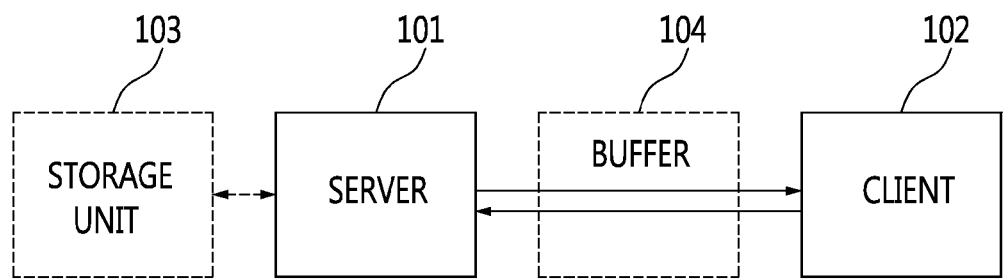
FIG. 1 is a schematic block diagram of an inner structure of a system for a HTTP streaming service in a multimedia system.
Figure 2:
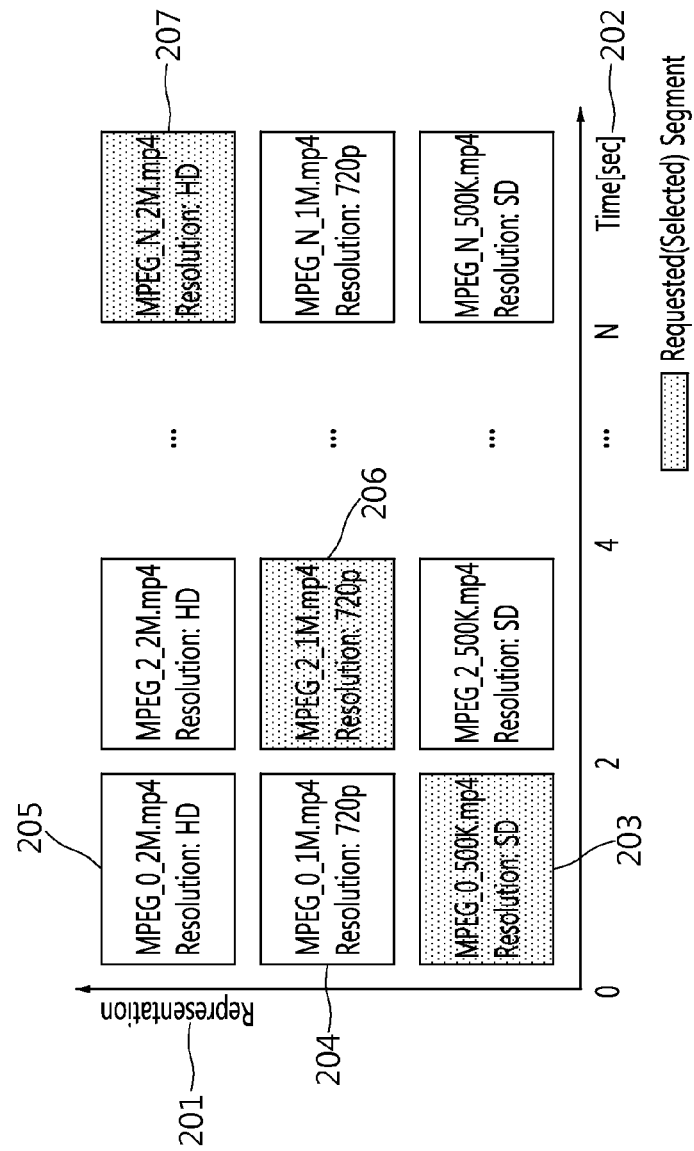
FIG. 2 is a block diagram of when a multimedia content is divided and stored into a plurality of segments of the same size for an HTTP streaming service.
Figure 3:
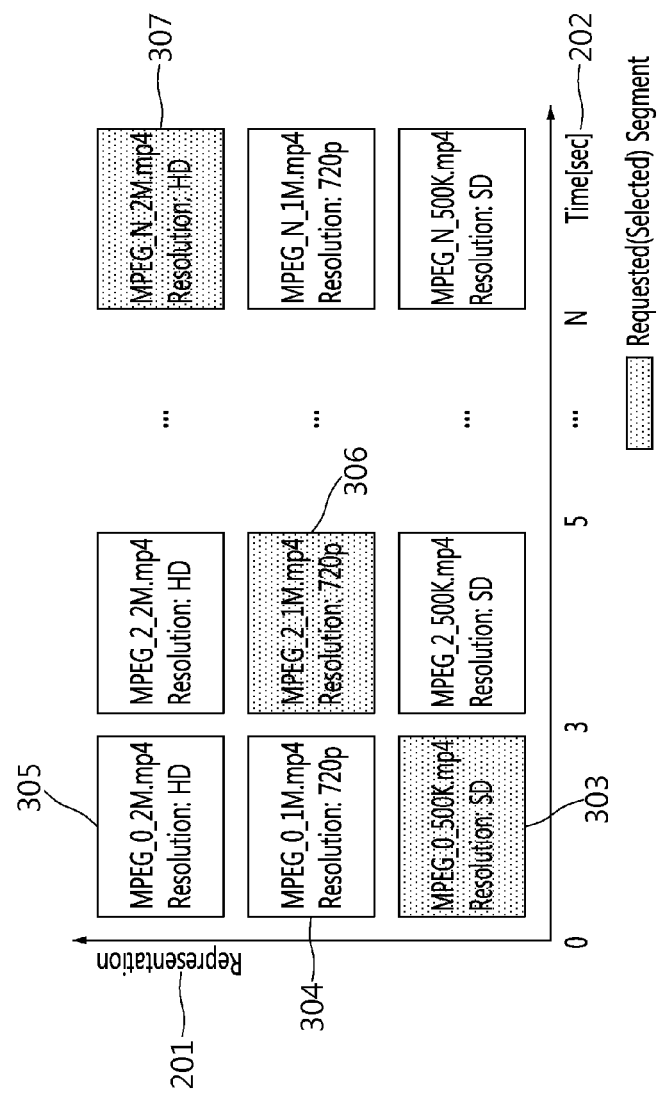
FIG. 3 is a block diagram of when a multimedia content is divided and stored into a plurality of segments of different sizes for an HTTP streaming service.
Figure 4:
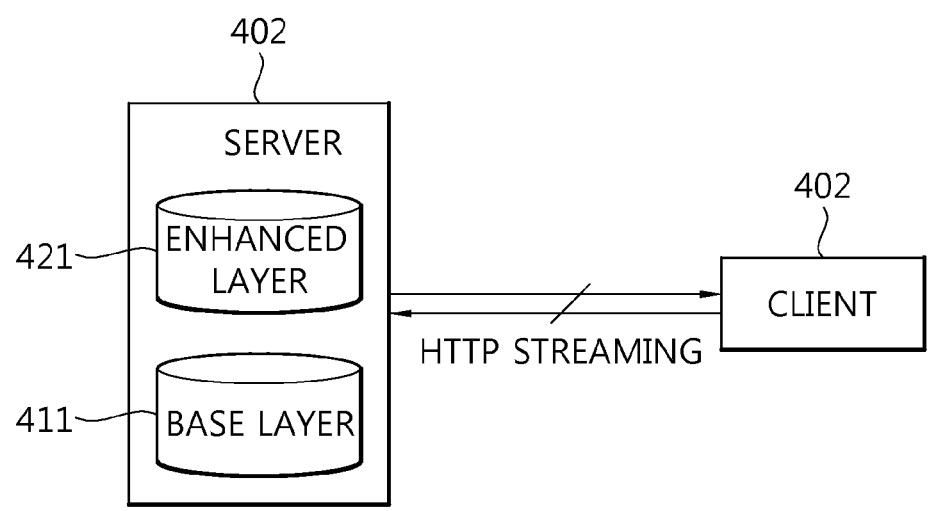
FIG. 4 is a schematic block diagram of an inner structure of a system for an HTTP streaming service according to an example embodiment of the present invention.

As the present invention may make various changes and have various forms, it is intended to illustrate specific embodiments in the drawings and describe them in detail. However, it should be understood that this is intended not to limit the present invention to specific disclosed forms but to include all changes, equivalents and replacements that fall within the spirit and technical scope of the present invention. Like reference signs are used for like components in describing each drawing.

Although the terms like a first, a second, A, and B are used to describe various components, the components should not be limited by the terms. The terms may be used for the purpose of distinguishing one component from another. For example, a first component may be named a second component and similarly, a second component may be named a first component without departing from the scope of right of the present invention. The term and/or includes a combination of a plurality of related described items or any of the plurality of related described items.

When being mentioned that a certain component is "connected" or "coupled" to another component, the former may directly be connected or coupled to the latter but the third component may exist between them. On the other hand, when being mentioned that a certain component is "directly connected" or "directly coupled" to another component, it should be understood that the third component does not exist between them.

The terms used herein are just for describing specific embodiments and are not intended to limit the present invention. The terms of a singular form may include plural forms unless clearly otherwise referred to in context. In this application, it should be understood that the term "include," "comprise," "have", "including", "comprising", or "having" is intended to specify that there are features, figures, steps, operations, components, parts or their combinations represented in the specification and not to exclude that there may be one or more other features, figures, steps, operations, components, parts, or their combinations or that they may be added.

Unless being otherwise defined, all terms used herein that include technical or scientific terms have the same meaning as those generally understood by those skilled in the art. The terms, such as those defined in dictionaries generally used should be construed to have meaning matching that having in context of the related art and are not construed as ideal or excessively perfunctory meaning unless being clearly defined in this application.

An exemplary embodiment according to the present invention will be described below in detail with reference to the accompanying drawings.

A server 401 may divide a multimedia content to be streamed into a plurality of segments, each of which has the same or a different size. In addition, the server may construct, for a second representation, a plurality of segments consisting of enhanced layers 421 of scalable video coding. In this case, the segments produced by the server 401 include a group of pictures GOP which consists of a header section, an I (intra-coded) frame on the basis of intra-frame encoding, P frame and B frame on the basis of predictive encoding.

First, an example is described in which the server 401 divides the multimedia content to be streamed into a plurality of segments of the same size and the server constructs, for the second representation of higher resolution than that of a first representation, a plurality of segments consisting of the enhanced layers 421 of the scalable video coding. In this case, since the second representation has higher resolution than that of the first representation, the second representation may have a higher bit rate than that of the first representation. The first representation may have a first bit rate and the second representation may have a second bit rate that is higher than the first bit rate. For example, the first representation may have a bit rate of 512 Kbps and the second representation may have a bit rate of 768 Kbps. Alternatively, the first representation may have a bit rate of 500 Kbps and the second representation may have a bit rate of 1 Mbps.

According to an exemplary embodiment of the present invention, when the total reproduction time of the multimedia content is 10 minutes, the bit rate for the first representation is 500 Kbps, and the bit rate for the second representation is 1 Mbps, the server 401 may divide the multimedia content by two-second unit, construct 300 segments consisting of base layers 411 of scalable video coding that have the bit rate of 500 Kbps for the first representation, and construct 300 segments consisting of the enhanced layers 421 of the scalable video coding that have the bit rate of 1 Mbps for the second representation.

Second, an example is described in which the server 401 divides the multimedia content to be streamed into a plurality of segments of different sizes, and the server constructs, for the second representation of higher resolution than that of the first representation, a plurality of segments consisting of the enhanced layers 421 of the scalable video coding. According to an exemplary embodiment of the present invention, when the total reproduction time of the multimedia content is 10 minutes, the bit rate for the first representation is 500 Kbps, and the bit rate for the second representation is 1 Mbps, the server 401 may divide the multimedia content alternately by two-second unit and by three-second unit, construct 240 segments consisting of base layers 411 of scalable video coding that have the bit rate of 500 Kbps for the first representation, and construct 240 segments consisting of the enhanced layers 421 of the scalable video coding that have the bit rate of 1 Mbps for the second representation.

The server 401 may receive a request for transmitting segments from a client 402. According to an exemplary embodiment of the present invention, when the server 401 receives a request for transmitting segments having a low bit rate from the client 402 as the client senses that the current channel state becomes worse while the client 102 receives a part of the segments consisting of the enhanced layers 421 of the scalable video coding and outputs the segments having the bit rate of 1 Mbps for the second representation, the server 401 transmits, to the client 402, at least a part of the plurality of segments consisting of base layers 411 that have the bit rate of 500 Kbps for the first representation.

According to an exemplary embodiment of the present invention, when the server 401 receives a request for transmitting segments having a high bit rate from the client 402 as the client 102 senses that the current channel state becomes better while the client 102 receives a part of the segments consisting of the base layers 411 of the scalable video coding and outputs the segments having the bit rate of 500 Kbps for the first representation, the server 401 transmits, to the client 402, a part of the plurality of segments consisting of the enhanced layers 421 that have the bit rate of 1 Mbps for the second representation, together with at least a part of the plurality of segments consisting of base layers 411 that have the bit rate of 500 Kbps for the first representation.

The client 102 may initiate a streaming service. If the client 402 initiates the streaming service, the client 402 receives, from the server 401, a part of the segments constructing the first representation that consists of the base layers 411 and outputs segments having the bit rate of 500 Kbps for the first representation. In addition, the client 402 senses the current channel state, requests the server 401 to transmit segments when the current channel state changes, and outputs the segments received in response to the request.

According to an exemplary embodiment of the present invention, it is assumed that after the multimedia content with the total reproduction time of 10 minutes is divided into 60 reproduction sections, each of which has a reproduction section of 10 seconds, segments having the bit rate of 500 Kbps for the first representation are produced to construct 60 segments consisting of the base layers 411 of the scalable video coding, and segments having the bit rate of 1 Mbps for the second representation are produced to construct 60 segments consisting of the enhanced layers 421 of the scalable video coding.

According to an exemplary embodiment of the present invention, as the client 402 senses that the current channel state becomes better while the client outputs segments having the bit rate of 500 Kbps for the first representation, the client 402 receives, from the server 402, at least a part of the plurality of segments consisting of the base layers 411 that have the bit rate of 500 Kbps for the first representation, and at least a part of the plurality of segments consisting of the enhanced layers 421 that have the bit rate of 1 Mbps for the second representation.

According to an exemplary embodiment of the present invention, when the client 402 receives, from the server 402, at least a part of the plurality of segments consisting of the base layers 411 that have the bit rate of 500 Kbps for the first representation as the client 402 senses that the current channel state becomes worse while the client outputs segments having the bit rate of 1 Mbps for the second representation, the client 402 decodes and outputs a P frame of segments included in the base layers received from the server 401 by using an I frame of a segment that have the bit rate of 500 Kbps for the first representation of the base layer 411 received simultaneously when the enhanced layer 421 of video coding that is being currently decoded and output is received.

The process of transmitting an HTTP stream according to an exemplary embodiment of the present invention will be described below in detail with reference to FIG. 5.

Figure 5:
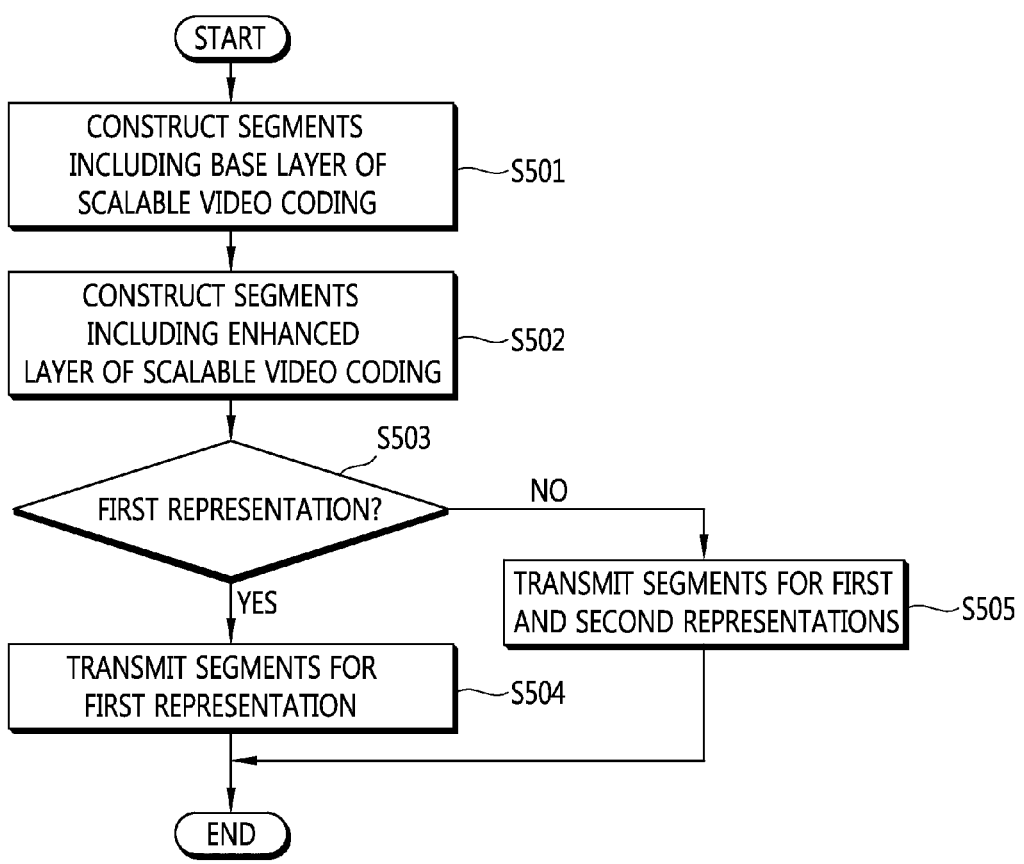
FIG. 5 is a flow chart of the process of transmitting an HTTP stream according to an exemplary embodiment of the present invention.

FIG. 5 is a flow chart of the process of transmitting an HTTP stream according to an exemplary embodiment of the present invention.

Referring to FIG. 5, the server 401 constructs a plurality of segments consisting of the base layers of scalable video coding for the first representation in step S501. The server 401 may divide a multimedia content to be streamed into a plurality of segments that have the same size or different sizes, and may construct a plurality of segments consisting of the base layers 411 of scalable video coding for the first representation. In this case, the segments produced by the server 401 consist of a GOP, which consists of a header section, an I frame on the basis of intra-frame encoding, P and B frames on the basis of predictive encoding.

First, an example is described in which the server 401 divides the multimedia content to be streamed into a plurality of segments of the same size and constructs, for the first representation, a plurality of segments consisting of the base layers 411 of the scalable video coding. According to an exemplary embodiment of the present invention, when the total reproduction time of the multimedia content is 10 minutes, and the bit rate for the first representation is 500 Kbps, the server 401 may divide the multimedia content by a two-second unit, produce 300 segments that have the bit rate of 500 Kbps for the first representation, and construct 300 segments consisting of the base layers 411 of the scalable video coding for the first representation.

Second, an example is described in which the server 401 may divide the multimedia content to be streamed into a plurality of segments of different sizes, and construct, for the first representation, a plurality of segments consisting of the base layers 411 of the scalable video coding. According to an exemplary embodiment of the present invention, if the total reproduction time of the multimedia content is 10 minutes and the bit rate for the first representation is 500 Kbps, the server 401 divides the multimedia content alternately by two-second and three-second units, and constructs 240 segments consisting of the base layers 411 of the scalable video coding for the first representation.

The server 401 constructs a plurality of segments consisting of the enhanced layers 421 of the scalable video coding for the second representation that has higher resolution than that of the first representation in step S502. The server 401 may divide a multimedia content to be streamed into a plurality of segments that have the same size or different sizes, and may construct a plurality of segments consisting of the enhanced layers 421 of the scalable video coding for the second representation. In this case, the segments produced by the server 401 consist of a GOP, which consists of a header section, an I frame on the basis of intra-frame encoding, P and B frames on the basis of predictive encoding.

First, an example is described in which the server 401 divides the multimedia content to be streamed into a plurality of segments of the same size and constructs, for the second representation with higher resolution than that of the first representation, a plurality of segments consisting of the enhanced layers 421 of the scalable video coding. According to an exemplary embodiment of the present invention, when the total reproduction time of the multimedia content is 10 minutes, the bit rate for the first representation is 500 Kbps, and the bit rate for the second representation is 1 Mbps, the server 401 may divide the multimedia content by a two-second unit, construct 300 segments that have the bit rate of 500 Kbps for the first representation, and construct 300 segments consisting of the enhanced layers 421 of the scalable video coding that have the bit rate of 1 Mbps for the second representation.

Second, an example is described in which the server 401 may divide the multimedia content to be streamed into a plurality of segments of different sizes, and construct, for the second representation with higher resolution than that of the first representation, a plurality of segments consisting of the enhanced layers 421 of the scalable video coding. According to an exemplary embodiment of the present invention, when the total reproduction time of the multimedia content is 10 minutes, the bit rate for the first representation is 500 Kbps, and the bit rate for the second representation is 1 Mbps, the server 401 divides the multimedia content alternately by two-second and three-second units, constructs 240 segments consisting of the base layers 411 of the scalable video coding that have the bit rate of 500 Kbps for the first representation, and constructs 240 segments consisting of the enhanced layers 421 of the scalable vide coding that have the bit rate of 1 Mbps for the second representation.

When transmitting the first representation in step S503, the server 401 transmits at least a part of the plurality of segments for the first representation in step S504. According to an exemplary embodiment of the present invention, when the server 401 receives in step S503 a request for transmitting segments having the bit rate of 500 Kbps for the first representation from the client 402 as the client 102 senses that the current channel state becomes worse while the client 102 receives a part of the segments consisting of the enhanced layers 421 of the scalable vide coding and outputs the segments having the bit rate of 1 Mbps for the second representation, the server 401 transmits in step S504, to the client 402, at least a part of the plurality of segments consisting of base layers 411 that have the bit rate of 500 Kbps for the first representation.

When transmitting the second representation in step S503, the server 401 transmits at least a part of the plurality of segments for the second representation, together with at least a part of the plurality of segments for the first representation in step S505. According to an exemplary embodiment of the present invention, when the server 401 receives in step S503 a request for transmitting segments having the bit rate of 1 Mbps for the second representation from the client 402 as the client 102 senses that the current channel state becomes better while the client 102 receives a part of the segments consisting of the base layers 411 of the scalable video coding and outputs the segments having the bit rate of 500 Kbps for the first representation, the server 401 transmits a part of the plurality of segments consisting of the enhanced layers 411 having the bit rate of 1 Mbps for the second representation, together with at least a part of the plurality of segments consisting of the base layers 411 that have the bit rate of 500 Kbps for the first representation, in step S505.

In FIG. 5, an example has been described in which when transmitting the second representation in step S503, the server 401 transmits at least a part of the plurality of segments for the second representation, together with at least a part of the plurality of segments for the first representation in step S505. However, when transmitting the second representation in step S503, the server 401 may transmit at least one of at least a part of the plurality of segments for the first representation and at least a part of the plurality of segments for the second representation. For example, when transmitting the second representation in step S503, the server 401 may alternately transmit at least a part of the plurality of segments for the first representation and at least a part of the plurality of segments for the second representation.

The process of receiving an HTTP stream according to an exemplary embodiment of the present invention will be described below in detail with reference to FIG. 6.

Figure 6:
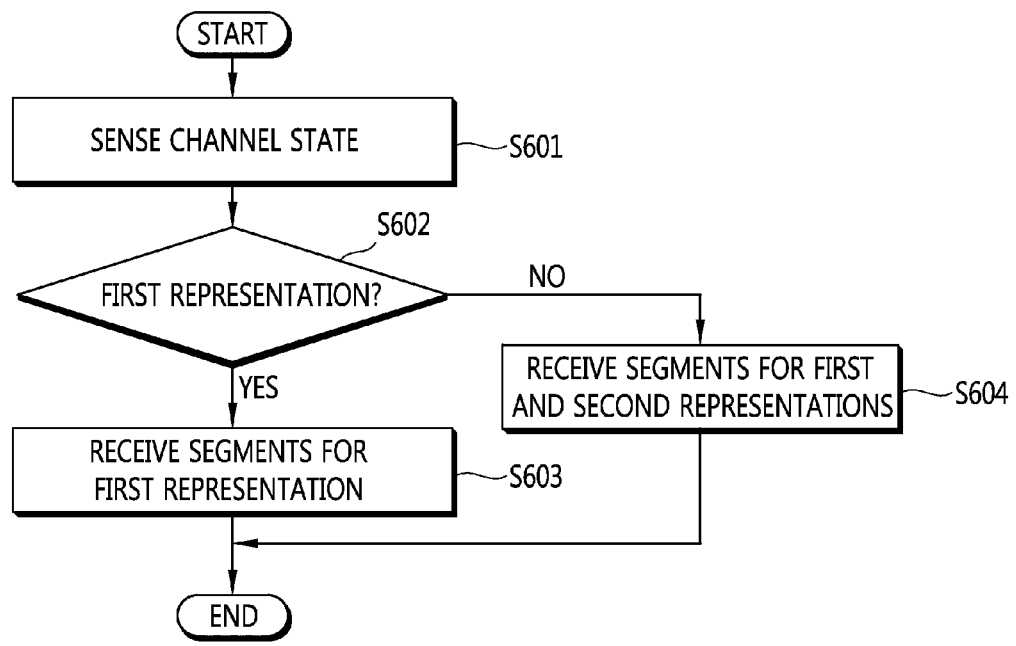
FIG. 6 is a flow chart of the process of receiving an HTTP stream according to an exemplary embodiment of the present invention.

FIG. 6 is a flow chart of process of receiving an HTTP stream according to an exemplary embodiment of the present invention.

Referring to FIG. 6, the client 402 senses the current channel state in step S601, requests the server 401 to transmit segments when the channel state changes, and outputs the segments received in response to the request. When the client 402 requests to transmit segments having the bit rate for the first representation in step 602, a part of the plurality of segments constructing the first representation are received and reproduced in step S603.

According to an exemplary embodiment of the present invention, it is assumed that after the multimedia content with the total reproduction time of 10 minutes is divided into 60 reproduction sections, each of which has a reproduction section of 10 seconds, segments having the bit rate of 500 Kbps for the first representation are produced to construct 60 segments consisting of the base layers 411 of the scalable video coding, and segments having the bit rate of 1 Mbps for the second representation are produced to construct 60 segments consisting of the enhanced layers 421 of the scalable video coding.

According to an exemplary embodiment of the present invention, when the client 402 receives, from the server 402, at least a part of the plurality of segments consisting of the base layers 411 that have the bit rate of 500 Kbps for the first representation as the client 402 senses that the current channel state becomes worse while the client outputs segments having the bit rate of 1 Mbps for the second representation, the client 402 decodes and outputs a P frame of segments included in the base layers received from the server 401 by using an I frame of a segment that has the bit rate of 500 Kbps for the first representation of the base layer 411 received simultaneously when the enhanced layer 421 of video coding that is being currently decoded and output is received.

When the client 402 requests segments having the bit rate for the second representation in step S602, a part of the plurality of segments constructing the first representation and a part of the plurality of segments constructing the second representation are received and reproduced in step S604. According to an exemplary embodiment of the present invention, as the client 402 senses that the current channel state becomes better while the client outputs segments having the bit rate of 500 Kbps for the first representation, the client 402 receives, from the server 402, at least a part of the plurality of segments consisting of the base layers 411 that have the bit rate of 500 Kbps for the first representation, and at least a part of the plurality of segments consisting of the enhanced layers 421 that have the bit rate of 1 Mbps for the second representation.

Although in FIG. 6, an example is described in which a part of the plurality of segments constructing the second representation together with a part of the plurality of segments constructing the first representation is received and reproduced, it is possible to receive and reproduce at least one of a part of the plurality of segments constructing the first representation and a part of the plurality of segments constructing the second representation. For example, it is possible to alternately receive and reproduce a part of the plurality of segments constructing the first representation and a part of the plurality of segments constructing the second representation.

A method of transmitting an HTTP stream according to an exemplary embodiment of the present invention may include the steps of constructing, for a first representation, a plurality of segments with a first bit rate of scalable vide coding, constructing, for a second representation, a plurality of segments with a second bit rate—which is higher than the first bit rate—of the scalable video coding, and transmitting a scalable video coding stream that consists of at least one of the first and second representations.

A device for transmitting an HTTP stream according to an exemplary embodiment of the present invention includes a producing unit that constructs, for a first representation, a plurality of segments with a first bit rate of scalable video coding, constructing, for a second representation, a plurality of segments with a second bit rate—which is higher than the first bit rate—of the scalable video coding, and a transmitting unit that transmits a scalable video coding stream that consists of at least one of the first and second representations. The transmitting unit may transmit at least a part of the plurality of segments for the first representation when transmitting the first representation. The transmitting unit may transmit at least one of a part of the plurality of segments for the first representation and a part of the plurality of segments for the second representation when transmitting the second representation. The transmitting unit may alternately transmit a part of the plurality of segments for the first representation and a part of the plurality of segments for the second representation when transmitting the second representation.

A method of receiving an HTTP stream according to an exemplary embodiment of the present invention receives, from the device for receiving the HTTP stream, an HTTP stream that includes at least one of the first and second representations. Specifically, the method of receiving the HTTP stream according to an exemplary embodiment of the present invention includes the steps of receiving, from a an HTTP streaming server, a first representation including at least a part of a plurality of segments with a first bit rate of scalable video coding, receiving, from the server for receiving the HTTP stream, a second representation including at least a part of a plurality of segments with a second bit rate—which is higher than the first bit rate—of the scalable video coding, and when reproducing the second representation, receiving and reproducing at least one of a part of the plurality of segments constructing the first representation and a part of the plurality of segments constructing the second representation, from the HTTP streaming server.

Although an example has been described in which a scalable video coding SVC content has first and second representations, the present invention may also be applied to examples in which the SVC content has first to third representations. In this case, the first representation may have a first bit rate, the second representation may have a second bit rate higher than the first bit rate, and the third representation may have a third bit rate higher than the second bit rate. For example, the first representation may have 512K, the second 768K, and the third 1024K, in bit rate.

While descriptions are made with reference to exemplary embodiments, those skilled in the art will be able to understand that various modifications and changes may be made without departing from the spirit and scope of the present invention stated in the following claims.

The invention claimed is:

1. A method of transmitting an HTTP stream comprising:
   generating a plurality of segments by dividing video stream by a time unit;

generating a media information file including Universal Resource Locator (URL) information of the plurality of segments and transmitting the media information file to a client;

constructing, for a first representation, a plurality of segments with a first bit rate of scalable video coding;

constructing, for a second representation, a plurality of segments with a second bit rate, which is higher than the first bit rate, of the scalable video coding;

constructing, for a third representation, a plurality of segments with a third bit rate, which is higher than the second bit rate, of the scalable video coding;

receiving a request for transmitting selected segments of specific representation from a client according to a current network environment sensed by the client;

wherein the client parses the media information file, selects the segments of the specific representation suitable for the network environment by referring the parsed information, and generates the request for the selected segments of the specific representation; and transmitting a scalable video coding stream that includes segments of at least one of the first, and the second, and the third representations, in response to the request;

wherein the third bit rate is double of the first bit rate and the second bit rate is a mean value of the first bit rate and the third bit rate.

2. The method of claim 1, wherein the scalable video coding complies with a coding scheme according to a scalable video coding standard according to scalable video coding of H.264/AVC.

3. The method of claim 1, wherein the transmitting of the first representation comprises transmitting at least a part of the plurality of segments for the first representation.

4. The method of claim 3, wherein the transmitting of the second representation comprises transmitting one of the part of the plurality of segments for the first representation and the part of the plurality of segments for the second representation, and wherein the transmitting of the third representation comprises transmitting the part of the plurality of segments for the first representation, the part of the plurality of segments for the second representation, and a part of the plurality of segments for the third representation.

5. The method of claim 3, further comprising; alternately transmitting the part of the plurality of segments for the first representation and the part of the plurality of segments for the second representation, when transmitting the second representation.

6. The method of claim 1, wherein segments in proportion to the number of representations according to contents information is generated.

7. A server for transmitting an HTTP stream comprising a processor that executes non-transitory computer program code stored on storage media, wherein the non-transitory computer program code includes instructions to:

generate a plurality of segments by dividing video stream by a time unit;

generate a media information file including Universal Resource Locator (URL) information of the plurality of segments;

construct, for a first representation, a plurality of segments with a first bit rate of scalable video coding;

construct, for a second representation, a plurality of segments with a second bit rate of the scalable video coding, wherein the second bit rate is higher than the first bit rate;

construct, for a third representation, a plurality of segments with a third bit rate of the scalable video coding, wherein the third bit rate is higher than the second bit rate;

receive a request for transmitting segments of specific representation from a client according to a current network environment detected by the client;

wherein the client parses the media information file, selects the segments of the specific representation suitable for the network environment by referring the parsed information, and generates the request for the selected segments of the specific representation; and transmit a scalable video coding stream that includes at least one of at least a part of the plurality of segments for the first representation and at least a part of the plurality of segments for the second representations, and at least a part of the plurality of segments for the third representations in response to the request, wherein the third bit rate is double of the first bit rate and the second bit rate is a mean value of the first bit rate and the third bit rate.

8. The server of claim 7, wherein transmitting the first representation includes transmitting at least a part of the plurality of segments for the first representation.

9. The server of claim 8, wherein transmitting the second representation includes transmitting the part of the plurality of segments for the first representation and the part of the plurality of segments for the second representation and wherein transmitting the third representation includes transmitting the part of the plurality of segments for the first representation, the part of the plurality of segments for the second representation, and the part of the plurality of segments for the third representation.

10. The server of claim 8, wherein the transmitter alternately transmits the part of the plurality of segments for the first representation and the part of the plurality of segments for the second representation, when transmitting the second representation.

11. A method of receiving an HTTP stream comprising:

receiving a media information file including information on a plurality of segments, the information on the plurality of segments including URL information of the plurality of segments;

receiving, from an HTTP streaming server, at least one of at least a part of a first representation at least a part of a second representation, and at least a part of a third representation, wherein the first representation has a plurality of segments with a first bit rate of scalable video coding, the second representation has a plurality of segments with a second bit rate of scalable video coding, and the third representation has a plurality of segments with a third bit rate of scalable video coding, wherein the plurality of segments are generated by dividing video stream by a time unit, wherein the second bit rate is higher than the first bit rate and the third bit rate is higher than the second bit rate;

detecting, by a client device, a current network environment;

transmitting a request for segments of specific representation to the HTTP streaming server according to the detected current network environment;

wherein the request for the segments of the specific representation is generated by parsing the media information file and selecting the segments of the specific representation suitable for the network environment according to the parsed information;

receiving, from the HTTP streaming server, at least one of a part of the plurality of segments for the first representation, at least a part of the plurality of segments for the second representation, and at least a part of the plurality of segments for the third representation, in response to the request; and reproducing the received segments;

wherein the third bit rate is double of the first bit rate and the second bit rate is a mean value of the first bit rate and the third bit rate.

12. The method of claim 11, further comprising:

receiving, from the HTTP streaming server, a part of the plurality of segments for the first representation in response to the request for transmitting the first representation.

13. The method of claim 11, further comprising:

alternately receiving, from the HTTP streaming server, the part of the plurality of segments for the first representation and the part of the plurality of segments for the second representation in response to the request for transmitting the second representation.

* * * * *